United States Patent
Hronek

(10) Patent No.: US 6,727,090 B1
(45) Date of Patent: Apr. 27, 2004

(54) APPARATUS FOR PRODUCING COMPOST TEA

(76) Inventor: Dennis R. Hronek, P.O. Box 546, Windsor, CO (US) 80550

( * ) Notice: Subject to any disclaimer, the term of this patent is extended or adjusted under 35 U.S.C. 154(b) by 27 days.

(21) Appl. No.: 10/189,969

(22) Filed: Jul. 3, 2002

(51) Int. Cl.[7] ................................................. C12M 1/00
(52) U.S. Cl. .................... 435/290.4; 210/167; 210/197; 71/9; 71/11; 71/23
(58) Field of Search ........................... 435/290.2, 290.4; 210/167, 197; 71/9, 11, 23

(56) References Cited

U.S. PATENT DOCUMENTS

| | | |
|---|---|---|
| 3,236,743 A | 2/1966 | Pierson |
| 3,616,932 A | 11/1971 | Bancroft |
| 4,105,412 A | 8/1978 | Petzinger |
| 4,499,561 A | 2/1985 | Mason et al. |
| 5,169,782 A | 12/1992 | Murphy et al. |
| 5,277,825 A | 1/1994 | Tobler et al. |
| 5,472,474 A | 12/1995 | Nakazono |
| 5,583,045 A * | 12/1996 | Finn ........................ 435/290.1 |
| 5,591,637 A | 1/1997 | Inoue |
| 5,718,508 A | 2/1998 | Williams |
| 6,099,613 A | 8/2000 | Allen et al. |
| 6,337,203 B1 * | 1/2002 | Beaulieu .................. 435/262.5 |
| 6,555,359 B2 * | 4/2003 | Cummings .................. 435/267 |

OTHER PUBLICATIONS

"How to Use Compost" printed Jun. 18, 2002, from the compostinfo.com web site.
"Understanding Compost Tea" printed Jun. 18, 2002, from the jgpress.com web site.
"Micro brewer—The Original Compost Tea Machine" printed Jun. 18, 2002, from the microbbrewer.com web site.
"What is Compost Tea?" printed Jun. 18, 2002, from the composttea.com web site.
"Compost Tea: A Renewed Ancient Idea" printed Jun. 18, 2002, from the gardening.wsu.edu web site.

* cited by examiner

Primary Examiner—David A. Redding
(74) Attorney, Agent, or Firm—Thomte, Mazour & Niebergall; Dennis L. Thomte

(57) ABSTRACT

An apparatus for producing compost tea wherein compost material is passed through a separator housing in such a manner so that microorganisms on the compost material is washed from the compost material and is delivered to a separator tank positioned below the separator housing. The wash water from the separator tank is recirculated through the apparatus until the desired concentration of microorganisms has been achieved.

18 Claims, 6 Drawing Sheets

APPARATUS FOR PRODUCING COMPOST TEA

BACKGROUND OF THE INVENTION

1. Field of the Invention

This invention relates to an apparatus for producing compost tea and more particularly to an improved apparatus for producing compost tea so that the tea may be sprayed upon the ground to enhance the treatment of the soil.

2. Description of the Related Art

Compost tea describes many different preparations made using compost as a starting material and producing a liquid extract or, in some cases, a "liquid version" of the original compost. Compost tea is a readily available form of compost that will impact plants more quickly than compost mixed into the soil. Compost teas are applied either to the soil or to the plant foliage. Those applied to the soil will move into the root zone and affect the rhizosphere of the plant. Nutrients carried in the tea will be used by the plant as well as adding microorganisms in the soil. The microbes in the compost tea may have a lot of competition with other soil microorganisms, but have the opportunity to become a part of the soil and rhizosphere microbial ecology. Compost teas applied to the plant foliage will immediately impact the plant. Compost tea, like compost itself, has the potential to be a powerful tool for agriculture. Compost tea extracts nutrients and microorganisms from the compost and allows a person to apply these beneficial components to plants. Compost tea acts as a weak liquid fertilizer, low in nitrogen but high in microbes. There are many home-designed pieces of equipment and some commercially available equipment made to produce compost tea. It is believed that the apparatus described herein represents a distinct improvement over the prior art equipment for producing compost tea in that the instant apparatus washes nutrients and microorganisms from the compost being passed therethrough and recirculates the wash water until the desired concentration is achieved.

SUMMARY OF THE INVENTION

An apparatus for producing compost tea is described which includes a hopper into which the compost material is placed. The bottom of the hopper is inclined and has a first screw conveyor mounted therein which conveys the compost material towards the lower end thereof. Preferably, a anti-bridging screw conveyor is positioned in the compost hopper above the first conveyor for preventing bridging of the compost material in the hopper. The compost material is discharged from the lower end of the hopper downwardly through a tube into the lower end of an upwardly inclined separator housing which has a screw conveyor rotatably mounted therein for conveying the compost material from the lower end of the separator housing to the upper end of the separator housing. The screw conveyor in the separator housing includes a hollow auger shaft having a plurality of water discharge spray nozzles mounted thereon. A cylindrical screen surrounds a portion of the screw conveyor in the separator housing. A separator tank is positioned below the separator housing and is in fluid communication therewith for receiving the microorganism-laden wash water therein.

The apparatus also includes a water tank having a first water conduit extending from the discharge port thereof to the inlet side of a motor-driven pump. A second water conduit extends from the discharge side of the pump to the inlet side of an inline filter. The interior of the inline filter has a cylindrical screen which is spaced inwardly from the exterior wall of the filter. A third water conduit extends from the side of the filter to the auger shaft for supplying water to the discharge nozzles. A fourth water conduit extends from the second water conduit to a receptacle for containing the finished compost tea. A control valve is imposed in the fourth water conduit. A fifth water conduit extends from the lower end of the separator tank to the first water conduit. A sixth water conduit extends from the discharge side of the filter to the inlet side of the water tank.

Water is supplied to the auger shaft in the separator housing by means of the third water conduit so that water is sprayed from the discharge nozzles on the auger shaft onto the compost material being moved upwardly through the separator housing so that microorganisms on the compost material are washed therefrom with the wash water being collected in the separator tank and being recirculated to the first water conduit. The spent compost material discharged from the separator housing is conveyed or otherwise delivered to a spent compost material pile. The compost tea is recirculated through the apparatus until the compost tea has the desired concentration of microorganisms. When the predetermined level has been achieved, the compost tea is delivered to a receptacle or the like by means of the fourth water conduit.

It is therefore a principal object of the invention to provide an improved apparatus for producing compost tea.

Yet another object of the invention is to provide an apparatus for producing compost tea wherein microorganisms on the compost material are washed therefrom with the compost tea being recirculated through the apparatus until the proper concentration of microorganisms in the compost tea has been achieved.

Still another object of the invention is to provide an improved filter for use in an apparatus for producing compost tea.

These and other objects of the invention will be apparent to those skilled in the art.

DESCRIPTION OF THE PREFERRED EMBODIMENT

Figure 1:
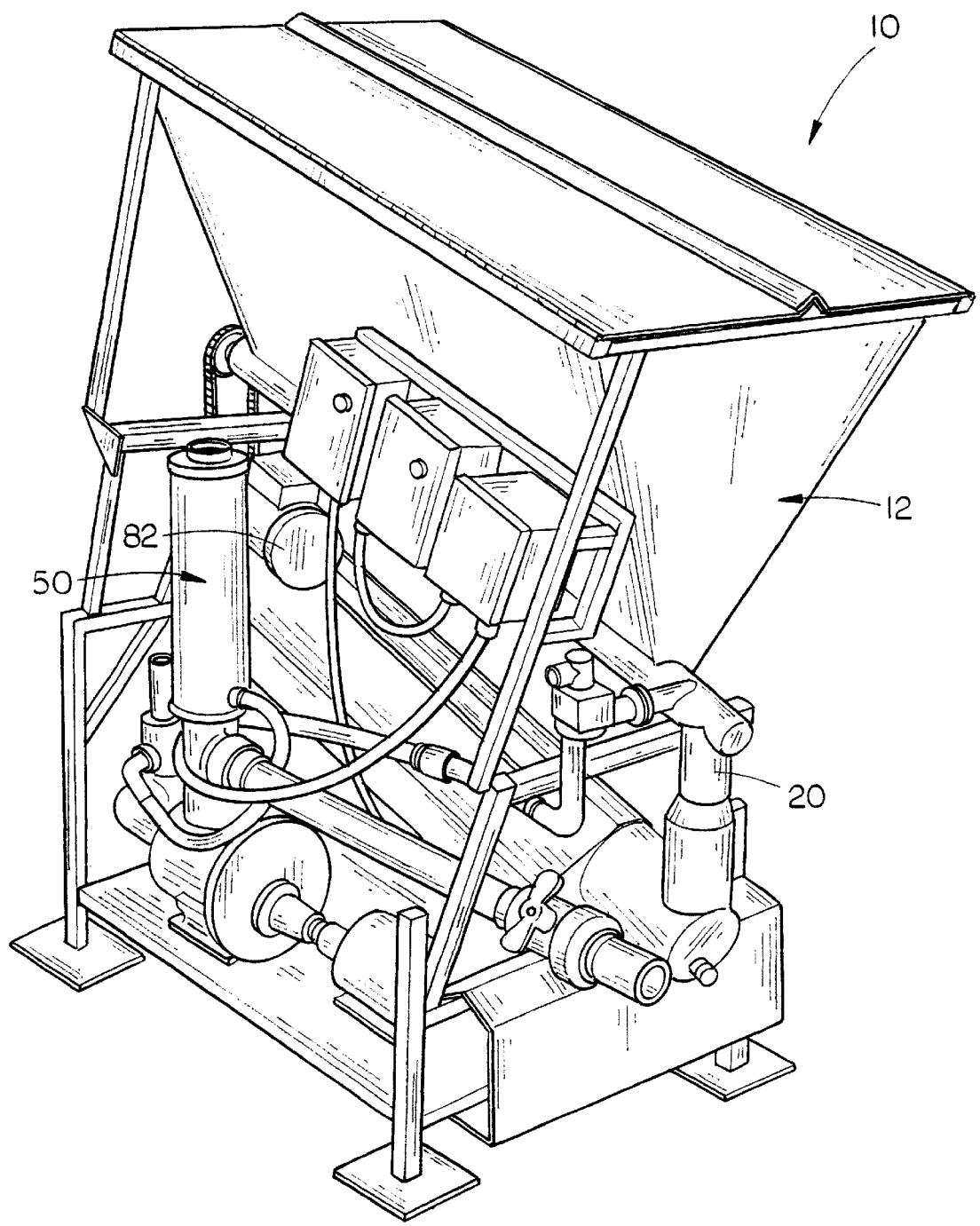
FIG. 1 is a perspective view of the apparatus of this invention.
Figure 2:
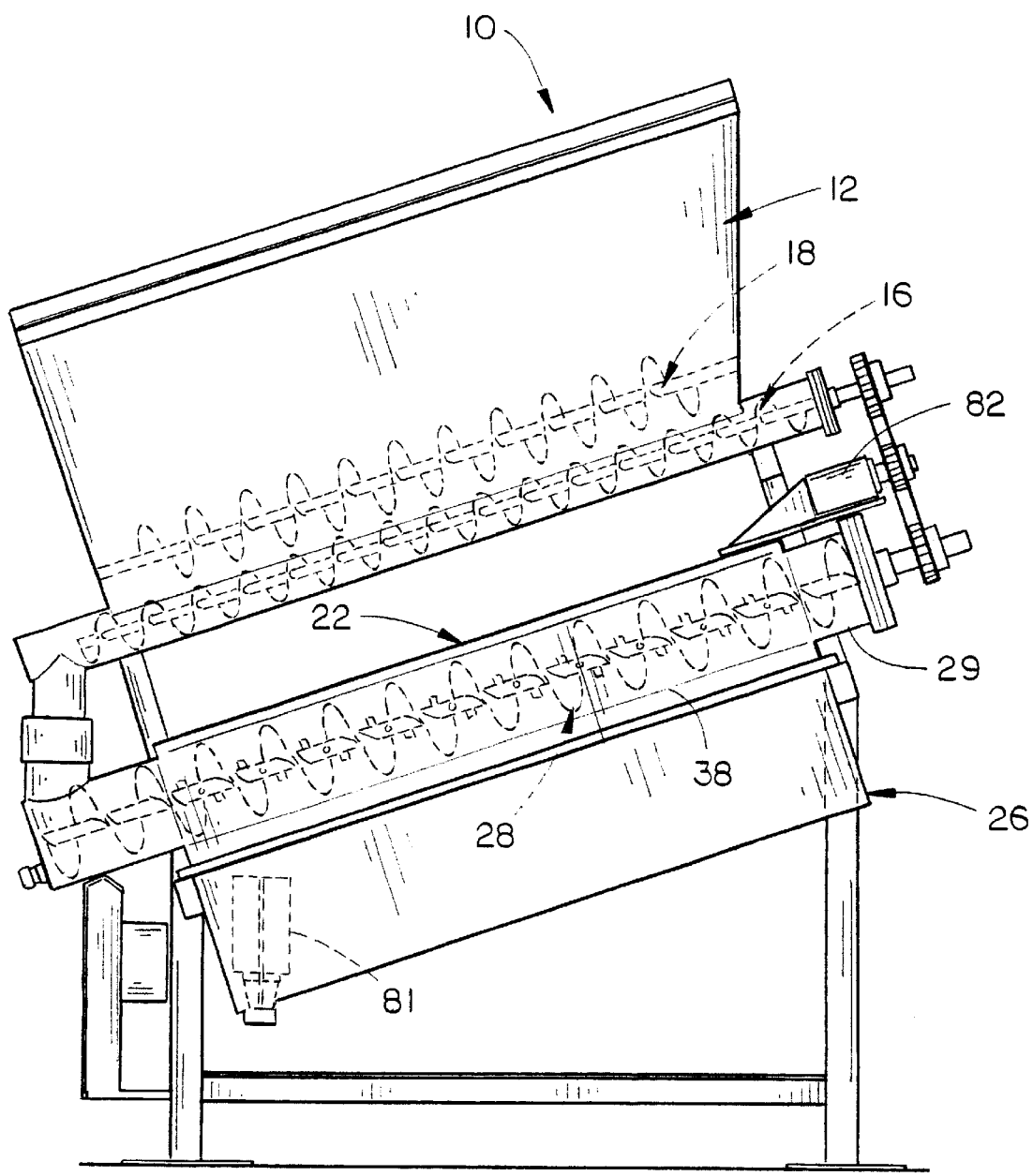
FIG. 2 is a side elevational view of the apparatus of this invention.
Figure 3:
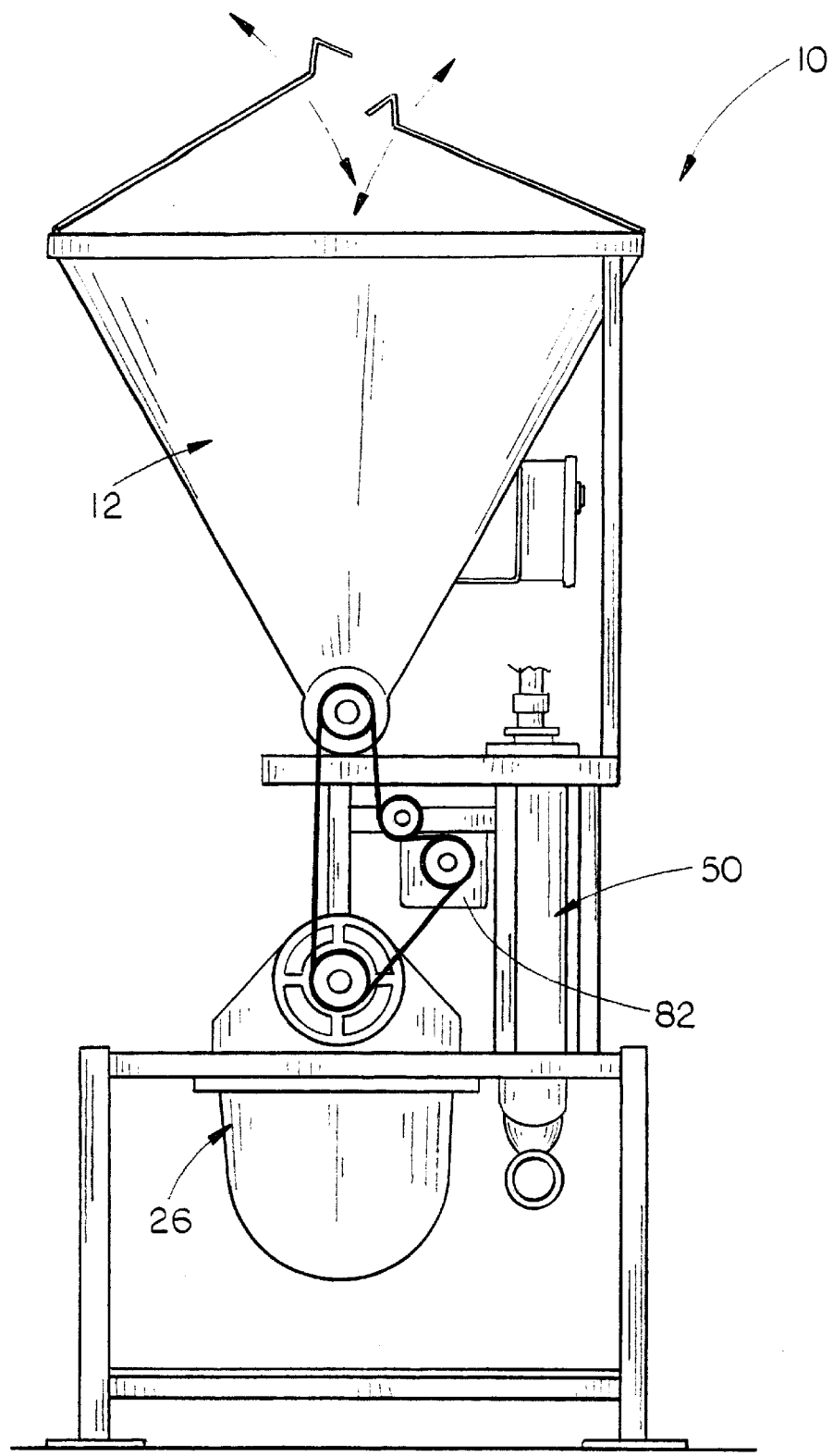
FIG. 3 is an end view of the apparatus of this invention.
Figure 4:
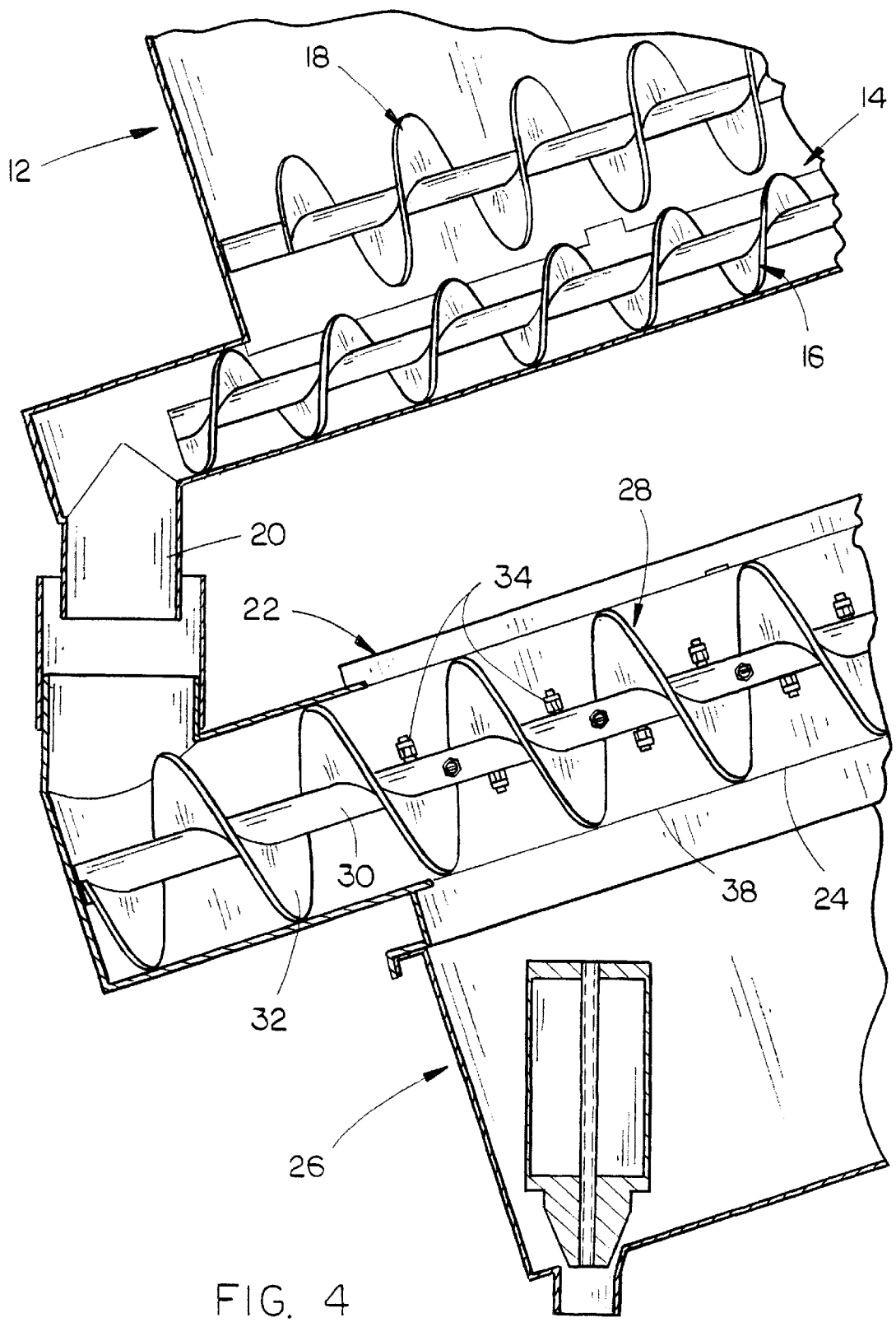
FIG. 4 is a partial sectional view of the apparatus.

The apparatus of this invention is referred to generally by the reference numeral 10. Apparatus 10 includes a compost hopper 12 which preferably has an inclined lower end and which is preferably V-shaped in section. The lower end of hopper 12 is provided with an opening 14 which is in communication with a screw conveyor 16 which is designed to convey compost material in the hopper 12 to the lower end thereof. Preferably, an anti-bridging screw conveyor 18 is provided in the hopper 12 for preventing bridging of the compost material above the screw conveyor 16. It is recommended that the anti-bridging screw conveyor 18 be rotated in a direction opposite to that of the screw conveyor 16 to efficiently prevent bridging of the compost material in the hopper.

Discharge tube 20 extends from the lower end of hopper 12 to the lower end of a separator housing 22 which is preferably inclined, as seen in the drawings. Separator housing 22 is provided with an open bottom 24 which is in communication with the upper end of a separator tank 26. A screw conveyor 28 is rotatably mounted and suitably driven within separator housing 22 to convey the compost material from the lower end of the housing 22 to the spent compost discharge opening 29 at the upper end of the separator housing 22. Screw conveyor 28 includes a hollow auger shaft 30 having helical flighting 32 mounted thereon. A plurality of discharge spray nozzles 34 are mounted on the auger shaft 30 and are in fluid communication with the interior of auger shaft 30. A cylindrical screen 38 extends around the screw conveyor 28 as will be described in more detail hereinafter.

Apparatus 10 also includes a water tank 40 having an outlet port 42 and an inlet port 44. A first water conduit 46 extends from the outlet port 42 of tank 40 to the inlet side of a motor-driven pump 48. Pump 48 is preferably driven by an electric motor 47, but the same could also be driven by a hydraulic motor or the like. A second water conduit 49 extends from the discharge side of the pump 48 to an inline filter 50 which is a very important part of the apparatus. Filter 50 is a full flow, self-cleaning filter.

Filter 50 includes a cylindrical housing 52 having upper and lower ends. Housing 52 includes a lower cap 54 having an inlet port 56 at its lower end. Inlet port 56 is in communication with filter end cap 58 which supports the lower end of a filter screen 60. End cap 62 is mounted on the upper end of filter screen 60 and is in communication with an outlet coupling or port 64. As seen in the drawings, the diameter of filter screen 60 is less than the diameter of filter housing 52 to define a space 66 therebetween. A filter tea port 68 is formed in housing 52 which is in communication with the space 66.

A third water conduit 70 extends between filter tea port 68 and the upper end of the interior of auger shaft 30. A fourth water conduit 72 extends from second water conduit 49 and has a shut-off valve 74 imposed therein. Water conduit 72 extends to a suitable container, receptacle or dispensing device such as a pivot sprinkler for containing the finished compost tea.

Figure 5:
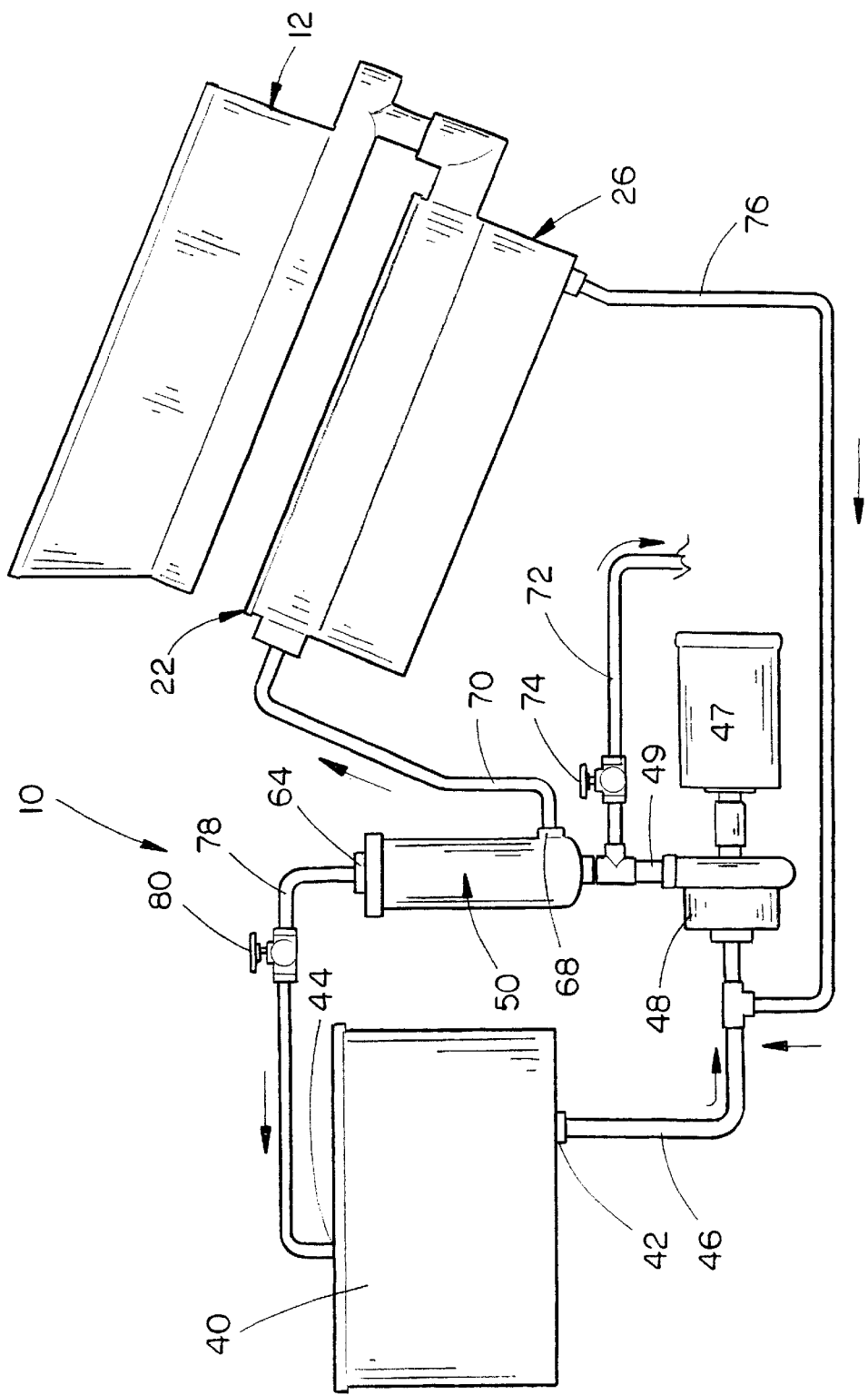
FIG. 5 is a schematic of the apparatus.
Figure 6:
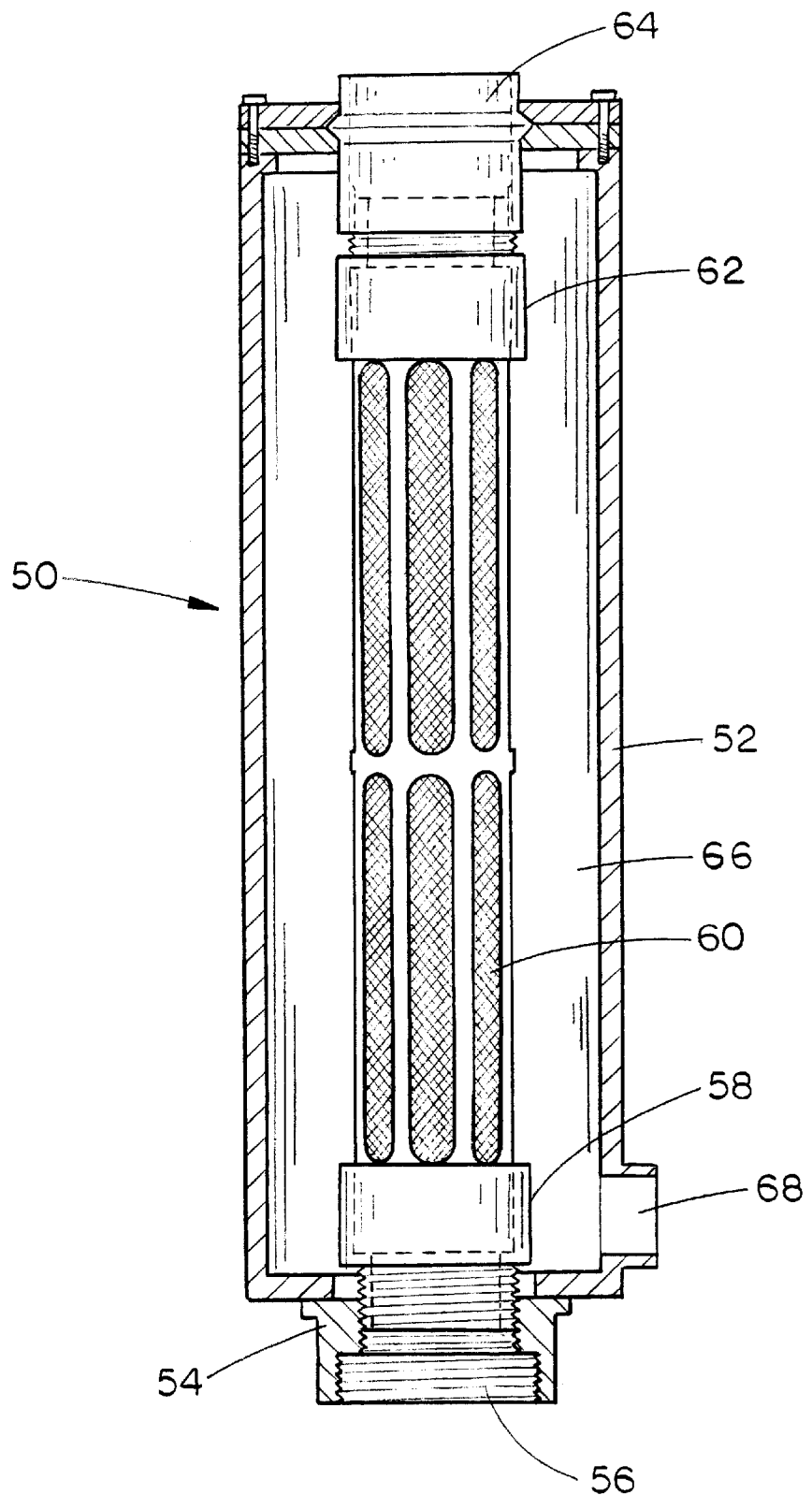
FIG. 6 is a partial sectional view of the full flow filter used in the apparatus.

A fifth water conduit 76 extends from the lower end of separator housing 26 to the first water conduit 46, as seen in FIG. 5. A sixth water conduit 78 extends from outlet port 64 of filter 70 to the inlet port 44 of tank 40. Control valve 80 is imposed in conduit 76, as also seen in the drawings. Float assembly 81 is provided in the lower interior of separator housing 26. Motor 82 drives the screw conveyors 16, 18 and 28 through a suitable chain and sprocket mechanism which does not form a part of this invention.

The method of operation of the apparatus 10 is as follows. Compost material is placed into the hopper 12 and pump 48 is actuated by motor 47. At this time, valve 74 will be closed and control valve 80 will be adjusted to achieve a sufficient "head" for the pump 48. Float assembly 81 will also prevent water from being discharged unevenly from housing 26. Water from the tank 40 passes through the first water conduit 46 to the inlet side of the pump 48 with the water being discharged from the pump 48 through the second water conduit 49 into the interior of the screen 60 of filter 50. The water is filtered by the filter screen 60 with the space 66 being filled with the filtered water. Water is discharged from the upper end of the filter 50 and returned to the inlet side of the tank 40. Filtered water is also passed from the space 66 outwardly through the filtered tea port 68 to the upper end of the auger shaft 30 which causes water to be supplied to the discharge nozzles 34. The screw conveyor 16 and the anti-bridging screw conveyor 18 in compost hopper 12 are operated so that compost material is supplied to the lower end of separator housing 22 with the screw conveyor 28 conveying the compost material upwardly from the lower end of the separator housing 22 to the upper end of the separator housing 22. As the screw conveyor 28 is rotated, the spray nozzles 34 spray water onto the compost material which washes the microorganisms on the compost material from the compost material with the wash water passing through the cylindrical screen 38 into the separator tank 26. When a sufficient water level is reached in housing 26, float assembly 81 opens to permit water to flow from housing 26. The wash water containing the microorganisms from the compost material is passed to first water conduit 46 by means of the fifth water conduit 76 for recirculation. The wash water is passed through the pump 48 and into the full flow, self-cleaning filter 50 with a portion of the wash water being delivered to the tank 40 by means of the sixth water conduit 78 and a portion of the wash water being recirculated to the separator housing 22 by means of the third water conduit 70. The spent or washed compost material passes from the upper end of separator housing 22 and is conveyed or transported to a suitable collection area for the spent compost material.

The apparatus washes compost material in the separator housing 22 and recirculates the wash water containing the microorganisms washed from the compost material through the system until the proper concentration of microorganisms in the wash water has been reached so that a desirable compost tea is achieved. When the desired concentration of the compost tea has been achieved, the valve 74 is opened to transfer the compost tea to a suitable dispensing vessel by means of the fourth water conduit 72. When the compost tea has been delivered to the suitable storage receptacle, water is added to the tank 40 with the process being repeated.

Thus it can be seen that a novel apparatus for producing compost tea has been provided which achieves all of its stated objectives.

I claim:

1. An apparatus for producing compost tea, comprising:

a hopper adapted to contain compost material;

an elongated separator housing having first and second ends;

said first end of said separator housing being in communication with said hopper so that compost material is delivered to said first end of said separator housing;

a perforated tubular member positioned in said separator housing between said first and second ends thereof;

an auger conveyor rotatably mounted within said perforated tubular member for conveying compost material from said first end of said separator housing to said second end thereof;

said auger conveyor having water discharge spray nozzles mounted thereon for directing water onto the compost material being conveyed by said auger conveyor to wash microorganisms from the compost material;

a source of water in communication with said discharge spray nozzles on said auger conveyor;

a separator tank positioned below said separator housing and being in fluid communication therewith for receiving the microorganism-laden wash water.

2. The apparatus of claim 1 wherein said auger conveyor comprises a shaft having helical flighting thereon and wherein said discharge spray nozzles are mounted on said shaft.

3. The apparatus of claim 2 wherein said shaft is hollow and is in fluid communication with said source of water.

4. The apparatus of claim 3 wherein said source of water comprises a water tank having intake and discharge ports; said discharge port of said tank being in fluid communication with the intake end of a motor-driven pump by means of a first conduit; the discharge side of said pump having a second conduit extending therefrom to the intake end of a filter; said filter having a third conduit extending therefrom to said shaft; a fourth conduit extending from said second conduit to a receptacle for the compost tea; a valve in said fourth conduit; and a fifth conduit extending from said separator tank to said first conduit by means of a sixth conduit; the discharge end of the filter being in communication with the intake port of said water tank.

5. The apparatus of claim 4 further including a control valve in said sixth conduit.

6. The apparatus of claim 1 wherein said separator tank is fluidly connected to a water pump which delivers water under pressure to a fluid filter which is in communication with said discharge nozzles and said source of water.

7. The apparatus of claim 1 wherein said hopper includes a feed auger.

8. The apparatus of claim 7 wherein said hopper also includes an anti-bridging conveyor positioned above said feed auger.

9. The apparatus of claim 6 wherein a float assembly is provided in said separator tank for controlling the flow of water to said water pump.

10. An apparatus for producing compost tea, comprising:

an inclined hopper having upper and lower ends;

said hopper adapted to contain compost material therein;

an inclined separator housing positioned below said hopper and having a closed upper end and an open lower end;

said housing having an elongated perforated tubular member positioned therein;

an auger conveyor rotatably mounted in said perforated tubular member and having upper and lower ends;

an inclined separator tank positioned below said separator housing and having an upper end which is in fluid communication with said open lower end of said separator housing;

said auger conveyor comprising an auger shaft having helical flighting thereon;

said auger shaft having water discharge nozzles provided thereon;

said auger shaft having a central bore which is in fluid communication with said discharge nozzles;

said lower end of said compost hopper being in communication with said lower end of said separator housing;

said separator housing having a washed compost material discharge at its said upper end;

a water tank having inlet and outlet ports;

a motor-driven water pump having intake and discharge ends;

a first water conduit fluidly connecting said outlet port of said water tank with said intake end of said water pump;

an inline water filter having a cylindrical housing, a perforated cylindrical screen in said housing which has a diameter less than said cylindrical housing;

said filter having an inlet opening which is in communication with the discharge side of said water pump by means of a second water conduit;

said cylindrical housing of said filter having a first outlet opening formed therein which is in communication with the interior of said perforated cylindrical screen and a second outlet opening formed therein which is in communication with the exterior of said perforated cylindrical screen;

a third water conduit extending between said second outlet opening and one end of said central bore of said auger shaft;

a fourth water conduit extending between said second water conduit and a container for temporarily storing compost tea therein;

a shut-off valve imposed in said fourth water conduit;

a fifth water conduit extending between the lower end of said separator tank and said first water conduit;

and a sixth water conduit extending from said first outlet opening of said filter and said inlet port of said water tank.

11. The apparatus of claim 10 further including a control valve imposed in said sixth water conduit.

12. The apparatus of claim 10 further including a first screw conveyor rotatably mounted in said compost hopper for conveying compost material towards said lower end of said compost hopper.

13. The apparatus of claim 12 further including an anti-bridging second screw conveyor rotatably mounted in said compost hopper above said first screw conveyor.

14. The apparatus of claim 10 further including a float assembly in said separator housing.

15. The apparatus of claim 6 wherein said fluid filter is a full flow, self-cleaning filter.

16. A method of producing compost tea, comprising the steps of:

(1) providing an elongated separator housing, with inlet and outlet ends, having an auger conveyor rotatably mounted thereon with the auger conveyor having liquid discharge spray nozzles mounted thereon;

(2) introducing compost material to the inlet end of the separator housing;

(3) operating said auger conveyor whereby the compost material is moved through the separator housing;

(4) discharging liquid from the spray nozzles to wash microorganisms from the compost material; and (5) collecting the microorganism-laden liquid for use as compost tea.

17. The method of claim 16 further including the step of recirculating the compost tea through the spray nozzles.

18. The method of claim 16 wherein the microorganism-laden liquid is passed through an inline filter and then collected in a tank.

* * * * *